Figures 1, 2:
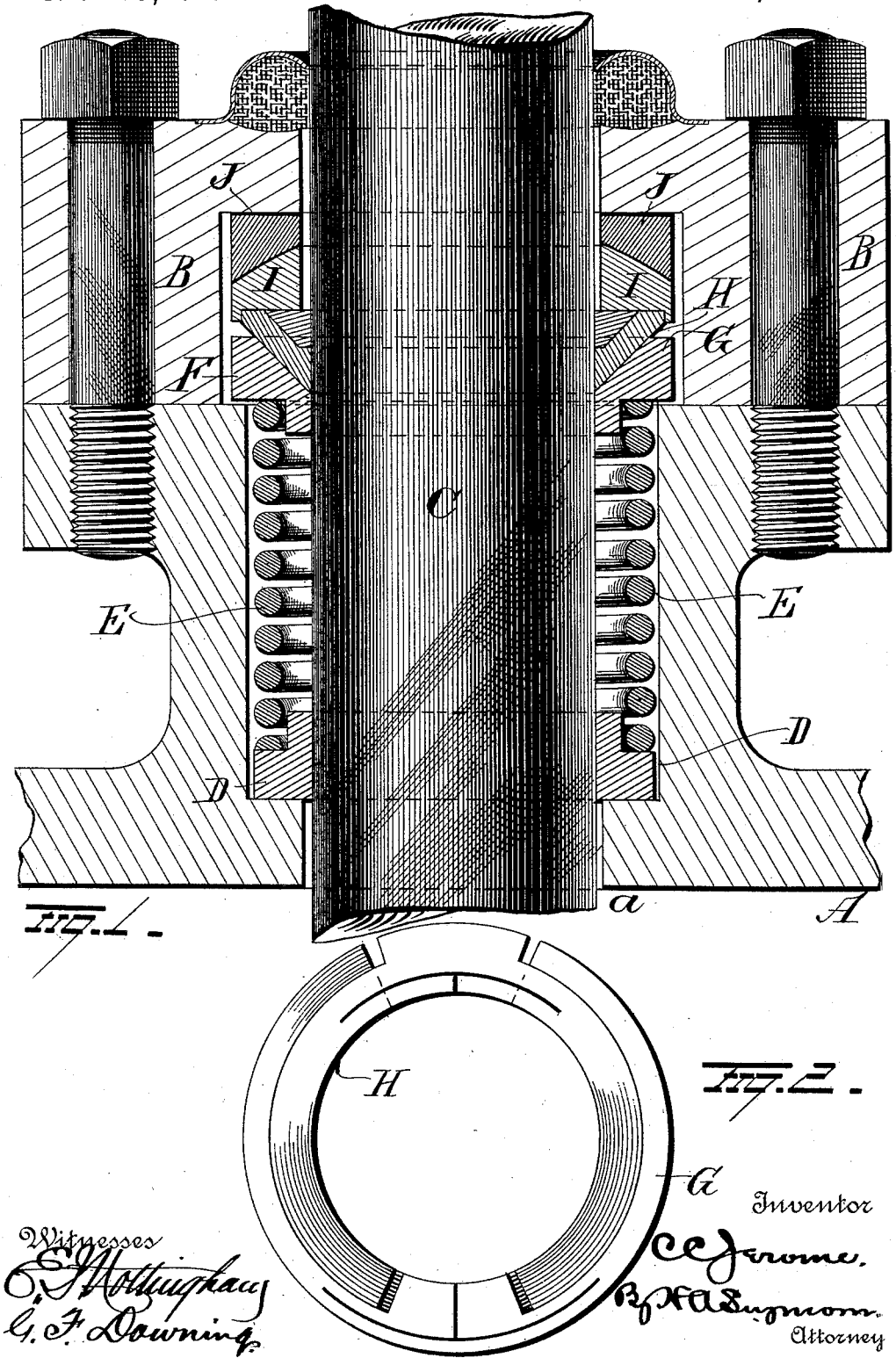

(No Model.)

C. C. JEROME.
ROD PACKING.

No. 465,858. Patented Dec. 29, 1891.

Witnesses
E. S. Nottingham
G. F. Downing

Inventor
C. C. Jerome
By H. A. Symmons
Attorney

THE NORRIS PETERS CO., PHOTO-LITHO., WASHINGTON, D. C.

UNITED STATES PATENT OFFICE.

CHARLES C. JEROME, OF CHICAGO, ILLINOIS.

ROD-PACKING.

SPECIFICATION forming part of Letters Patent No. 465,858, dated December 29, 1891.

Application filed May 19, 1891. Serial No. 393,316. (No model.)

*To all whom it may concern:*

Be it known that I, CHARLES C. JEROME, of Chicago, in the county of Cook and State of Illinois, have invented certain new and useful Improvements in Piston and Valve Rod Packings; and I do hereby declare the following to be a full, clear, and exact description of the invention, such as will enable others skilled in the art to which it appertains to make and use the same.

My invention relates to an improvement in piston and valve rod packing, the object being to provide means whereby the packing is permitted to have a rolling as well as a lateral motion, so it can accommodate itself to all movements of the piston and at the same time constantly and under all conditions maintain a steam-tight joint.

With these ends in view my invention consists in the parts and combinations of parts, as will be more fully described, and pointed out in the claims.

In the accompanying drawings, Figure 1 is a view in section of a stuffing-box and gland with my improvement therein, and Fig. 2 is a view of the packing-rings detached.

A represents the stuffing-box provided at its outer open end with a flange for the reception of the gland B, the latter being recessed on its inner face for the reception of the packing-rings to be hereinafter described. The head a of the cylinder and the gland B are each provided with an opening slightly larger than the piston or valve rod C for the passage of said rod, and surrounding and closely embracing the rod and bearing against the head of the cylinder is the bushing D. The bushing D forms a seat for the spring E, which latter encircles the rod C, and bears at its outer end against the cone F. This cone is greater in diameter than the internal diameter of the stuffing-box, but is of less diameter than the internal diameter of the recess in the gland. Hence, while it is permitted to move laterally with the rod, it is prevented from moving into the stuffing-box. Consequently, if it or the parts between it and the gland should stick to the rod, they would be released by the cone coming in contact with the outer end of the stuffing-box. The cone opens or expands outwardly toward the gland and forms a seat for the beveled packing-ring G, and the inner inclined face of the latter forms a seat for the wedge-shaped split ring H. Both rings are split and arranged to break joints with each other and both project outwardly beyond the outer edge of the cone, so that as they wear away by contact with the rod they can be forced inwardly with pressure sufficient to maintain steam-tight joints. The rings bear at their outer ends against the seat-ring I, which latter is provided with an outer curved face ground to form a steam-tight joint with the concave face of the ring J, the outer flat face of ring J being ground to form a steam-tight joint with the inner face of the gland. The seat-ring I and cone F are both of less diameter than the diameter of the recess, so that they move laterally with the rod, and by means of the curved faces of the two rings I and J, I secure a universal or ball joint which permits of a rolling motion of the rod.

It is evident that numerous slight changes might be resorted to in the construction and arrangement of parts herein shown without departing from the spirit and scope of my invention, and hence I would have it understood that I do not wish to confine myself to the exact form and construction herein shown and described; but, Having fully described my invention, what I claim as new, and desire to secure by Letters Patent, is—

1. The combination, with a stuffing-box and gland, of a cone having a conical recess therein, a seat-ring provided with a flat inner face and an inwardly-projecting flange on said face and its opposite face cone-shaped, a ring J, the inner face of which corresponds to the outer face of the seat-ring, and packing-rings located between the flat surface of the seat-ring and the conical recess of the cone, substantially as set forth.

2. The combination, with a stuffing-box and gland having a recess formed therein of greater diameter than the diameter of the recess in the stuffing-box, of a cone of greater diameter than the recess in the stuffing-box, said cone located partly in the gland and provided in one face with a conical recess, a seat-ring provided with a conical outer face and a flat inner face, concentric cone-shaped packing-rings bearing on the flat face of the seat-ring and adapted to bear on the piston-rod, and a ring J, the inner face of which is made to correspond with the outer face of the seat-ring, substantially as set forth.

In testimony whereof I have signed this specification in the presence of two subscribing witnesses.

CHARLES C. JEROME.

Witnesses:
A. B. ELLIOTT,
GEO. C. JEROME.